(12) United States Patent
Mann et al.

(10) Patent No.: US 8,379,057 B2
(45) Date of Patent: *Feb. 19, 2013

(54) DYNAMIC PERSPECTIVE VIDEO WINDOW

(75) Inventors: Samuel A. Mann, Bellevue, WA (US); Joseph Bertolami, Seattle, WA (US); Matthew L. Bronder, Bellevue, WA (US); Michael A. Dougherty, Issaquah, WA (US); Robert M. Craig, Bellevue, WA (US); John A. Tardif, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/470,957

(22) Filed: May 14, 2012

(65) Prior Publication Data

US 2012/0223967 A1    Sep. 6, 2012

Related U.S. Application Data

(63) Continuation of application No. 12/416,505, filed on Apr. 1, 2009, now Pat. No. 8,194,101.

(51) Int. Cl.
*G09G 5/00* (2006.01)

(52) U.S. Cl. ........................................... 345/633

(58) Field of Classification Search .................... 345/633
See application file for complete search history.

(56) References Cited

U.S. PATENT DOCUMENTS

| | | | |
|---|---|---|---|
| 5,287,437 A | 2/1994 | Deering | |
| 6,538,649 B2 | 3/2003 | Bradski et al. | |
| 6,771,277 B2 | 8/2004 | Ohba | |
| 6,785,402 B2 | 8/2004 | Jouppi et al. | |
| 6,809,704 B2 | 10/2004 | Kulas | |
| 6,924,833 B1 | 8/2005 | McDowall et al. | |
| 7,050,078 B2 * | 5/2006 | Dempski | 715/700 |
| 7,298,414 B2 | 11/2007 | Stavely et al. | |
| 7,982,751 B2 | 7/2011 | Stotts et al. | |
| 8,194,101 B1 * | 6/2012 | Mann et al. | 345/633 |
| 2004/0070729 A1 * | 4/2004 | Wiebe et al. | 351/209 |
| 2004/0104935 A1 | 6/2004 | Williamson et al. | |
| 2006/0187305 A1 | 8/2006 | Trivedi et al. | |

FOREIGN PATENT DOCUMENTS

WO    WO 2006/097722    9/2006

OTHER PUBLICATIONS

Thomas Riisgaard Hansen, Eva Eriksson, and Andreas Lykke-Olesen; Use Your Head: Exploring Face Tracking for Mobile Interaction; Apr. 2006; CHI EA '06 CHI '06 extended abstracts on Human factors in computing systems; pp. 845-850.*

Thomas Riisgaard Hansen, Eva Eriksson, and Andreas Lykke-Olesen; Mixed Interaction Space—Expanding the Interaction Space with Mobile Devices; 2006; People and Computers XIX—The Bigger Picture 2006, Part 3, 365-380, DOI: 10.1007/1-84628-249-7_23; pp. 365-380.*

"Eye Tracking", http://webscripts.softpedia.com/script/Multimedia/Video/EyeTracking-44796.html, Downloaded from the internet on Oct. 3, 2008, 3 pages.

(Continued)

*Primary Examiner* — Jeffery A Brier
(74) *Attorney, Agent, or Firm* — Woodcock Washburn LLP

(57) ABSTRACT

Systems and methods are disclosed for generating an image for a user based on an image captured by a scene-facing camera or detector. The user's position relative to a component of the system is determined, and the image captured by the scene-facing detector is modified based on the user's position. The resulting image represents the scene as seen from the perspective of the user. The resulting image may be further modified by augmenting the image with additional images, graphics, or other data.

20 Claims, 9 Drawing Sheets

OTHER PUBLICATIONS

Chowdhury et al., "Fast scene change detection based histogram", International Conference on Computer and Information Science, 2007, 5 pages.

Eriksson et al., "Movement-based interaction in cameral spaces: a conceptual framework", Pers Ubiquit. Comput., 2007, 11, 621-632.

Huang et al., "Driver head pose and view estimation with single omnidirectional video stream", Preceedings of the 1st International Conference on Computer Vision Systems, Austria, Apr. 3, 2003, 44-51.

Malassiotis et al., "Real-time head tracking and 3D pose estimation from range data", Informatics & Telecommunications Institute, 2003, 859-862.

Peri et al., Generation of perspective and panoramic video from omnidirectional video, Proc. Fo DARPA Image Understanding Workshop, New Orleans, May 1997, 3 pages.

* cited by examiner

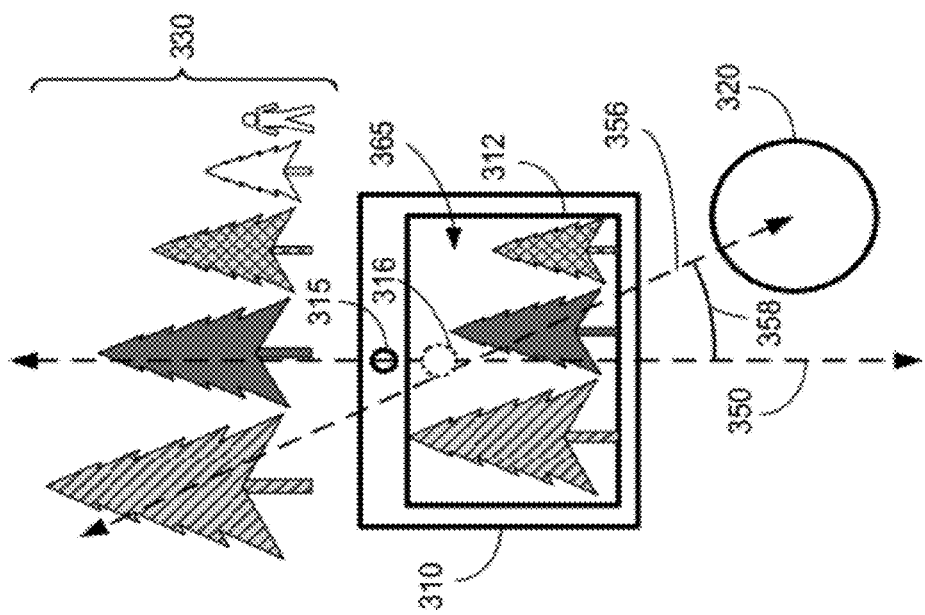
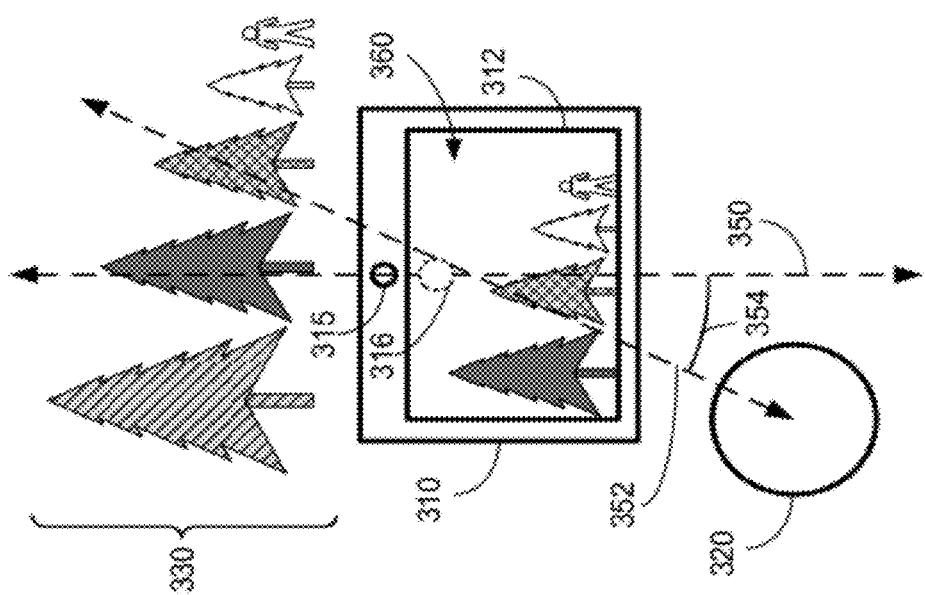
*Figure 3a*
*Figure 3b*

DYNAMIC PERSPECTIVE VIDEO WINDOW

CROSS-REFERENCE TO RELATED APPLICATION

This is a continuation of U.S. application Ser. No. 12/416,505, now U.S. Pat. No. 8,194,101, filed Apr. 1, 2009, entitled "Dynamic Perspective Video Window", the contents of which are incorporated by reference herein.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the patent and trademark office patent files or records, but otherwise reserves all copyright rights whatsoever. The following notice shall apply to this document: Copyright©2009, Microsoft Corp.

BACKGROUND

Augmented reality is the combining of real world data and computer-generated data to create a user environment. Real world data may be collected using any suitable data collection means, such as a camera, microphone, light and/or heat detector, or any other detection mechanism. This data may then be processed and combined with computer generated data to create the user environment. One of the most common forms of augmented reality is the use of live video images captured with a camera that are processed and augmented with computer-generated graphics or other images. The resulting augmented video images are then presented to a user through a user interface, such as a video monitor. Augmented reality can be used in video games, mapping, navigation, advertising, architecture visualization, and numerous other applications.

Live video images captured for augmented reality use may be images of the physical environment surrounding the user. This allows a user to interact with a virtual reality environment while still interacting with the actual physical environment around the user. A limitation of the current technology used to implement augmented reality is the images presented to a user may not actually reflect the viewpoint of the user because these images do not take into account the actual position of the user in the physical environment.

SUMMARY

Systems, methods, and computer-readable media are disclosed for generating a dynamic perspective video window. A scene-facing image may be captured on a first detector, such as a camera, while a user-facing image may be captured on a second detector, which may also be a camera. The user's position relative to a display device may be determined from the user-facing image. Based on the user's position, a portion of the scene-facing image may be determined and cropped from the scene-facing image. The resulting cropped image may the be rendered on a display for viewing by the user. Additional alterations may be made to an image before it is presented to a user. For example, additional images, graphics, text, etc. may be composited with a cropped image. This additional data may also be adjusted or modified based on the user's position relative to a display device. Various means may be used to determine a user position from a user-facing image. Also provided herein are methods for determining a cropping location and cropping area dimensions based on the user position.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings:

FIG. 3a is a graphical representation demonstrating the image processing that may be performed by a dynamic perspective video window system.

FIG. 3b is another graphical representation demonstrating the image processing that may be performed by a dynamic perspective video window system.

DETAILED DESCRIPTION

Dynamic Perspective Video Window

Figure 1A:
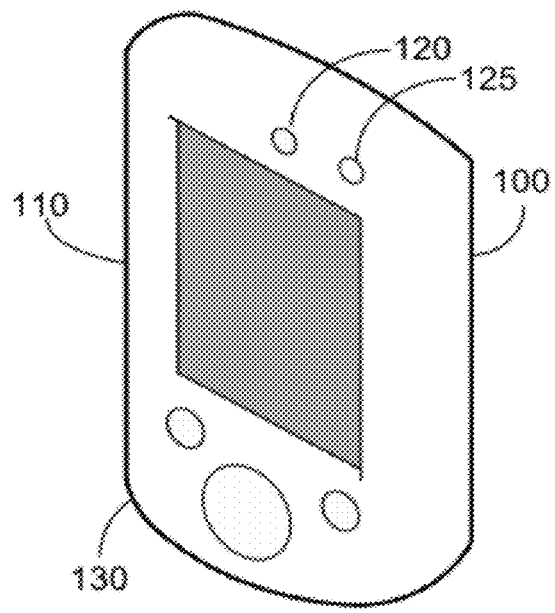
FIG. 1a is a graphical representation of one side of a device that may be used to implement parts of or a complete dynamic perspective video window system.
Figure 1B:
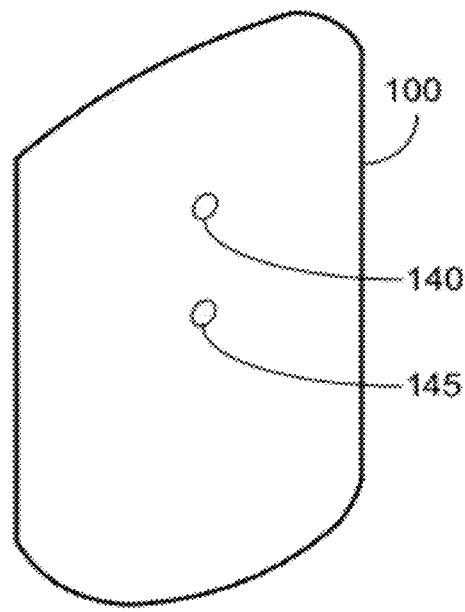
FIG. 1b is a graphical representation of another side of a device that may be used to implement parts of or a complete dynamic perspective video window system.

A dynamic perspective video window system and/or related systems and methods may be implemented using a variety of devices and configurations. FIGS. 1a and 1b illustrate an exemplary, non-limiting device 100 that may be used in a dynamic perspective video window system. Device 100 may be any device capable of implementing the systems and/or methods disclosed herein, such as a dedicated video window device, a stereoscopic device, an augmented reality user interface device, or any other device dedicated to implementing a dynamic perspective video window system. Alternatively, device 100 may perform one or more aspects of a dynamic perspective video window system and work in conjunction with one or more other devices to implement a complete dynamic perspective video window system. Device 100 may also be integrated into one or more other devices that are capable of performing other activities beyond implementing a dynamic perspective video window system. Such devices may include a personal data assistant (PDA), a mobile telephone, a laptop or desktop computer, a mobile or stationary gaming system, a virtual reality helmet system, a stereoscopic eyewear, helmet or headgear, a camera, a video display simulating a window or a picture frame, a video or still image display configured to appear to be transparent, or any other device capable of implementing a dynamic perspective video window system and performing at least one other function. All such configurations and devices are contemplated as within the scope of the present disclosure.

FIG. 1a displays a user-facing side of device 100. On the user-facing side, device 100 may have a display 110 that may be any type of display capable of displaying video or still images. Display 110 may be a liquid crystal display (LCD), a cathode ray tube (CRT), a plasma display, a light-emitting diode (LED) display, an image projection device, or any other type if display or device capable of presenting an image visible to a user. Device 100 may also have more than one display. For example, device 100 may be a stereoscopic headgear with two displays, one for each eye, that create a three-dimensional effect when viewed. Multiple display configurations may be made up of multiple displays of the same type, or several different types of displays. Device 100 may be configured with various user controls 130, which may include buttons, dials, touch pads, keyboards, microphones, light or heat detection components, and any other type of user interface. All such configurations are contemplated as within the scope of the present disclosure.

Device 100 may be configured with user-facing detector 120 that may be any type of detection component capable of detecting the position of a user or a part of a user relative to device 100 or detector 120, or detecting a representation of user or a part of a user relative to device 100 or detector 120. In one embodiment, user-facing detector 120 may be a standard camera capable of capturing one or more still images or video images. In another embodiment, user-facing detector 120 may be a detection device capable of detecting a user or the position of a user or any part or representation of a user through the detection of heat, sound, light, other types of radiation, or any other detectable characteristics. Examples of such detectors include, but are not limited to, infrared detectors, thermal detectors, and sound/acoustic detectors. Device 100 may have more than one user-facing camera or detection device, such as secondary user-facing detector 125. Multiple detection device may be used to detect a user, part of a user, or a representation of a user or part of a user in three-dimensional space. Any number and type of detection devices configured on the user-facing side of a device that are configured to detect a user or one or more parts of a user, or a representation of a user or one or more parts of a user, are contemplated as within the scope of the present disclosure.

FIG. 1b illustrates the scene-facing side of device 100. One or more detectors, such as scene-facing detectors 140 and 145, may be configured on the scene-facing side of device 100. Scene-facing detectors 140 and 145 may be any type of detector or camera that is capable of capturing an image or detecting information about a physical space within its range, including the types of detectors and camera described in regard to user-facing detectors 120 and 125.

Device 100 may also be configured with computing and communications components not shown in FIGS. 1a and 1b. The various components that may be integrated into device 100 and/or a dynamic perspective video window system are described in more detail herein, including in the sections describing FIGS. 8 and 9.

While device 100 as shown in FIGS. 1a and 1b has a single unit housing all the described components, the components and devices used in a dynamic perspective video window system may be physically separate. For example, user-facing detectors and scene-facing detectors may be physically separate from one or more displays and each other and located in separate housings. Moreover, other components, such as processors, memory, storage devices, etc. may be located in one or more physically distinct devices or components. Such devices or components may communicate with each other using communications technologies known in the art, including wired and wireless communications technologies. All such implementations and configurations of a dynamic perspective video window system are contemplated as within the scope of the present disclosure.

Figure 2:
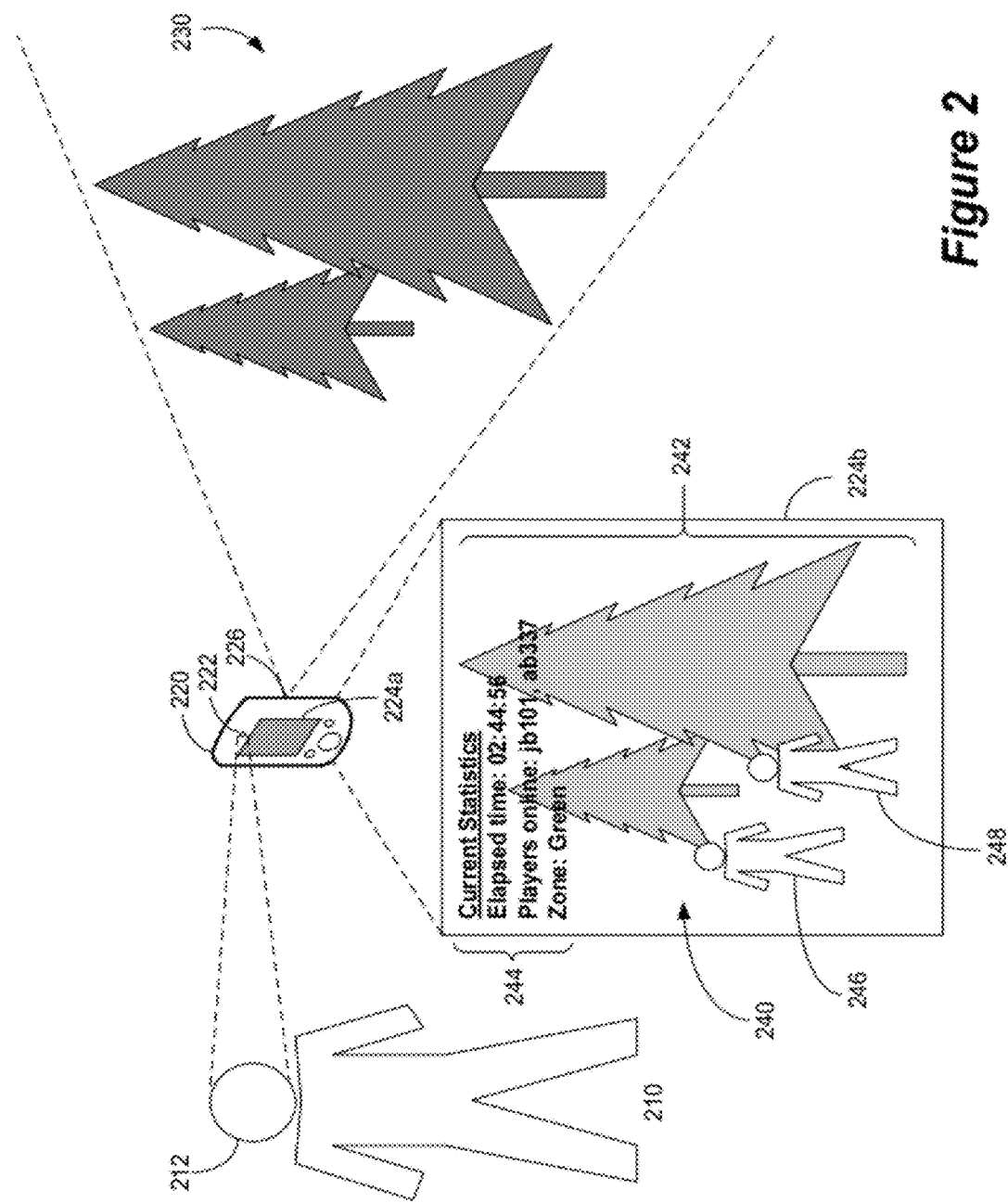
FIG. 2 is a graphical representation of a dynamic perspective video window system in use by a user proximate to a scene.

FIG. 2 illustrates the use of one embodiment of a dynamic perspective video window system. In FIG. 2, user 210 is operating device 220. Device 220 may be a device such as device 100 described in FIG. 1, or any other device or combination of devices and/or components capable of implementing one or more aspects of a dynamic perspective video window system. Device 220 may be configured with display 224a, user-facing detector 222, and scene-facing detector 226. Scene-facing detector 226 may be located on the back of device 220, and is not visible in FIG. 2 due to the positioning of device 220 in the figure. These components may be of any type, quantity, or configuration as described herein in regard to the various figures, or of any other type, quantity, or configuration.

User 210 may be operating device 220 proximate to scene 230. Scene 230 may be any physical space or area that scene-facing detector 226 is capable of detecting or from which scene-facing detector 226 may otherwise gather data. Device 220 may detect or capture data from scene 230, such as one or more video frame or still images. Device 220 may then process the image, including cropping and/or adjusting the image according to methods and means set forth herein. As part of the processing of the image, device 220 may augment the captured and/or processed image by overlaying graphics, text, other images, or any other visual data on the captured image, or compositing such data with the captured image, and present the processed image to user 210 by rendering the processed image on display 224a.

Magnified display 224b shows how a processed image may appear to user 210 when displayed on display 224a. Display 224b contains processed image 240. Processed image 240 may include image 242 captured by scene-facing detector 226. Alternatively, processed image 240 may contain an image resulting from the cropping, magnification, or other alteration by device 220 of image 242 as captured by scene-facing detector 226.

Processed image 240 may also include elements such as persons 246 and 248, that may have been overlaid on or composited with image 242 to create processed image 240. Persons 246 and 248 may be participants in an activity with user 210, such as a game incorporating augmented reality, and may be physically present at an area remote to scene 230. The images of persons 246 and 248 as rendered in processed image 240 may be altered or adjusted by device 220 and/or another device based on the determined location of user 210 and/or a part of user 210 as described herein. Additional information may be added to processed image 240, such as information 244. Any other information, images, or other data may be added to an image taken by scene-facing detector 226.

All such information, images, or other data may be generated by device 220, or received at device 220 through one or means of communications, such as wireless or wired computer network communications.

Processed image 240 may be cropped, magnified, or otherwise altered in some way based on the position or location of user 210 or some part of user 210, such as user's head 212, relative to device 220. In one embodiment, user-facing detector 222 detects the location of user's head 212 relative to device 220 and adjusts image 242 detected by scene-facing detector 226 to generate processed image 240. In another embodiment, user 210 may have affixed to the user or a part of the user a device that communicates location and/or position information to device 220. For example, user 210 may be wearing a helmet with communications components capable of transmitting messages to device 220 and components configured to detect or determine user 210's position or location relative to device 220. All such means of determining a user's position or location are contemplated, and examples of such means will be discussed in more detail herein.

The processing performed to generate processed image 240 may include altering or adjusting one or more images captured by scene-facing detector 226 of scene 230, and/or altering or adjusting one or more images associated with a virtual environment that are composited with one or more scene images. For example, processed image 240 may include an adjusted scene image composited with a computer-generated image of a game character and/or an image of a remotely located user participating in an augmented reality application that was transmitted to device 220. The computer-generated image of a game character and/or the image of another user may be adjusted based on the location of user 210 or one or more parts of user 210 relative to device 220. Image processing may be performed using any of the means or methods described herein, or any other processing means and methods, and all such embodiments are contemplated as within the scope of the present disclosure.

The location of a user or a part of a user relative to device 220, such as the user's head or the user's eyes, may be determined using any effective method. Such methods may include traditional or three-dimensional facial recognition, skin texture analysis, and/or software algorithms designed to detect the position of a user or part(s) of a user from an image or other detected information, including a representation of a user rather than an actual user. Alternatively, a user may have affixed upon the user light-emitting glasses, detectable tags, or other implements that allow the detection of the user or one or more parts of the user. For example, the user may have adhesive dots attached to the user's head near the eyes that are detectable by a specific form of detector, such as a detector configured to detect a specific form of radiation emitted by the adhesive dots. The detection of these dots may be used to determine the location of the user's eyes relative to device 220. Other methods may be used instead, or in conjunction with, these methods. Any method or means capable of providing data that may be used to determine the location, proximity, or any other characteristic of a user or a user's location relative to a device is contemplated as within the scope of the present disclosure.

Alternatively, the location of a user or parts of a user relative to a device may be determined based on the physical location of the display(s), such as display 224a/b and display 110. In one embodiment, a dynamic perspective video window system may be implemented in a helmet, headgear, or eyewear. The location of the user's eyes may be determined by assuming that the user's eyes are proximate to the display(s) that are set into the area in the helmet, headgear, or eyewear that would normally be proximate to the eyes when the helmet, headgear, or eyewear is affixed to or worn by a user. For example, in a dynamic perspective video window system implemented in eyewear with displays set into or proximate to where eyeglass lenses would normally be situated, the system may assume that the user's eyes are just behind the displays. Similarly, in a helmet-implemented system, the system may assume that the user's eyes are proximate to an eye-covering portion of the helmet. Other configurations and implementations that determine eye locations or the locations of other parts of a user relative to a device based on the location of a part of the system assumed to be proximate to the user or a part of the user are contemplated as within the scope of the present disclosure.

FIG. 3a illustrates in more detail the image processing that may be performed by one embodiment of a dynamic perspective video window system. A user may be operating device 310 that may have incorporated into it, or may be communicatively connected to, user-facing detector 315 and display 312. Device 310 may also include, or be communicatively connected to, scene-facing detector 316, that may be located on the back of device 310, facing scene 330.

Scene-facing detector 316 may be detecting scene 330. Device 310 and scene 330 may be oriented on an axis 350, while a part of the user operating device 310, such as user's head 320, may be oriented on an axis 352. In one embodiment, user's head 320 is detected at angle 354 to the user's left of axis 350 by user-facing detector 315. Angle 354 may be used to calculate adjustments that are performed on the image or video frame detected by scene-facing detector 316 to create processed image 360 as displayed on display 312. Processed image 360 may include a cropped subset of the image captured by scene-facing detector 316. Device 310 may use angle 354, and/or other information about the location and/or position of user's head 320 relative to device 310, to determine a crop area and crop area location of the image captured by scene-facing detector 316 so that processed image 360 is presented to the user to create an effect of looking through a window rather than a video or image display. For example, because user's head 320 is detected to the left of device 310, processed image 360 may be cropped and a subset of the captured image from an area generally on the right in the image relative to axis 350 may be presented on display 312. Processed image 360 may also be composited with computer-generated or supplemental images that may be adjusted based on angle 354 or other user position information. Methods and means of cropping and adjusting the image will be described in more detail herein.

FIG. 3b illustrates another example of image processing that may be performed by an embodiment of a dynamic perspective video window system. Here, user's head 320 is to located to the user's right of axis 350 on axis 356, creating angle 358 between axis 350 and axis 356. Angle 358 may be used to calculate adjustments that are performed on the image or video frame detected by scene-facing detector 316 to create processed image 365 as displayed on display 312. Device 310 may use angle 358, and/or other information about the location and/or position of user's head 320 relative to device 310, to determine a crop area and crop area location of the image captured by scene-facing detector 316 so that a subset of the image from an area generally on the left of the image relative to axis 350 is displayed in processed image 365. Processed image 365 may also be composited with computer-generated or supplemental images that may be adjusted based on angle 358 or other user position information.

In another embodiment, the distance between a user and a device may be used to alter the images presented to the user to implement a lens effect. In FIG. 4a, user's head 320 is detected by user-facing detector 315 of device 310 to be distance 410 away from device 310. If device 310 determines that distance 410 is closer to device 310 than a predetermined viewing distance, device 310 may increase the amount of the image collected by scene-facing detector 316 to create processed image 420. This may create the effect of objects appearing to be the same size relative to the location of the user or part of the user. Device 310 may also reduce or otherwise adjust computer-generated or supplemental images associated with a virtual environment to maintain a realistic view of such virtual objects.

Figure 4B:
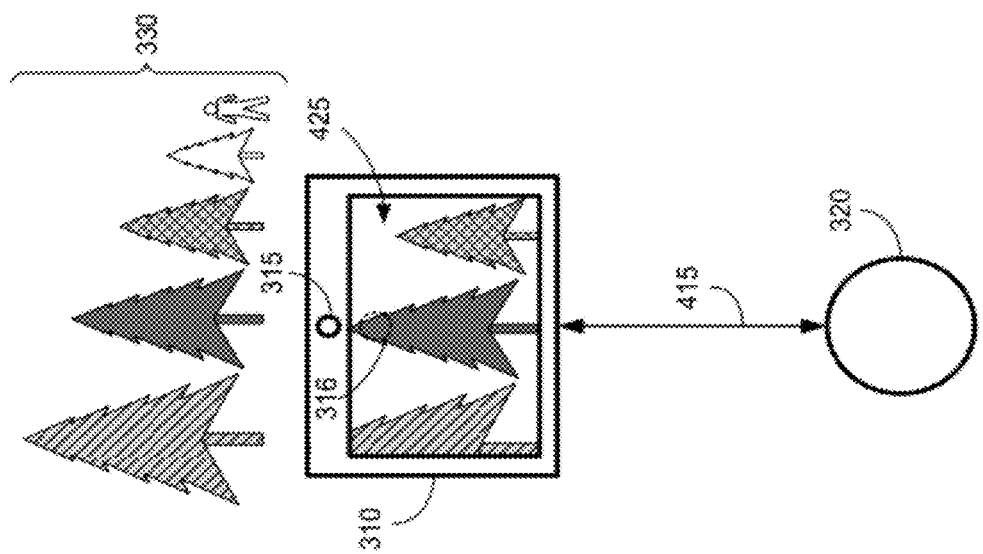
FIG. 4b is another graphical representation demonstrating the image processing that may be performed by a dynamic perspective video window system.
Figure 4A:
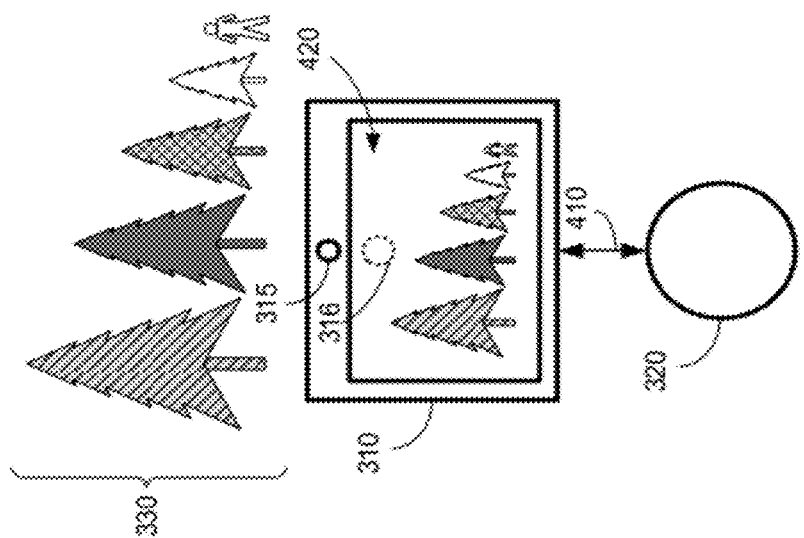
FIG. 4a is another graphical representation demonstrating the image processing that may be performed by a dynamic perspective video window system.

Alternatively, as seen in FIG. 4b, if user's head 320 is determined to be at a distance 415 that is greater than a predetermined viewing distance, device 310 may magnify or crop and expand a section of the image collected by scene-facing detector 316 that is presented to the user as processed image 425. Device 310 may also magnify, enlarge, or otherwise adjust computer-generated or supplemental images associated with a virtual environment to maintain a realistic view of such virtual objects.

Note that any combination of lens effect and image cropping may be used to create a processed image that is presented to a user. For example, a user may move closer to and to the right of a user-facing detector and/or a display device, resulting in the system shifting left and enlarging a selected region of the captured image. Also, detection of the user or parts of the user being higher or lower in altitude relative to an axis may be used to determine a subset of a captured image presented to the user. For example, the user's head may be higher than an axis of a device and/or a scene, and therefore a subset of the image generally located in a lower portion of a captured image may be presented to the user on a display. Likewise, the user's head may be lower than an axis of a device and/or a scene, and therefore a subset of the image generally located in a higher portion of a captured image may be presented to the user on a display.

Alterations may also be performed on images presented to a user that are part of the virtual environment of an augmented reality application or system. Computer-generated images or images of actual users and/or objects that are not physically in the space captured by a scene-facing detector may be rendered using user location or position information so that such images appear correct in perspective and more realistic to the user. As with images captured by a scene-facing detector, computer-generated images may be adjusted in any dimension based on the location or position of the user relative to a device or detector using any of the methods or means described herein. Any combination of image alterations and any means and methods used to accomplish them are contemplated as within the scope of the present disclosure.

Note also that effects or other manipulations of an image (scene images, computer-generated images, and/or supplemental images) may be performed for purposes of distorting an image presented to a user rather than making an image more realistic for a user. For example, in some embodiments images may be processed resulting in exaggerated perspectives, such as a small change in the position of the user relative to a device results in a large change in the image presented to the user. Alternatively, images may be processed to reflect the opposite or a different perspective than what would be expected. For example, a user may move closer to a device, and the image may be magnified rather than reduced. Such embodiments may be used for entertainment or any other purpose, and all such embodiments are contemplated as within the scope of the present disclosure.

In some embodiments, such image alterations may be performed continuously. For example, when used in video applications, image alterations may be performed on each video frame and altered images presented to a user in real-time, or near real-time, thus enabling a truly interactive experience. Images may be altered in other ways as well, including augmenting images to include graphics, other video images, and any other information or data that may be desired. For example, images altered by the presently disclosed dynamic perspective video window system may be used in an augmented reality application.

Figure 5:
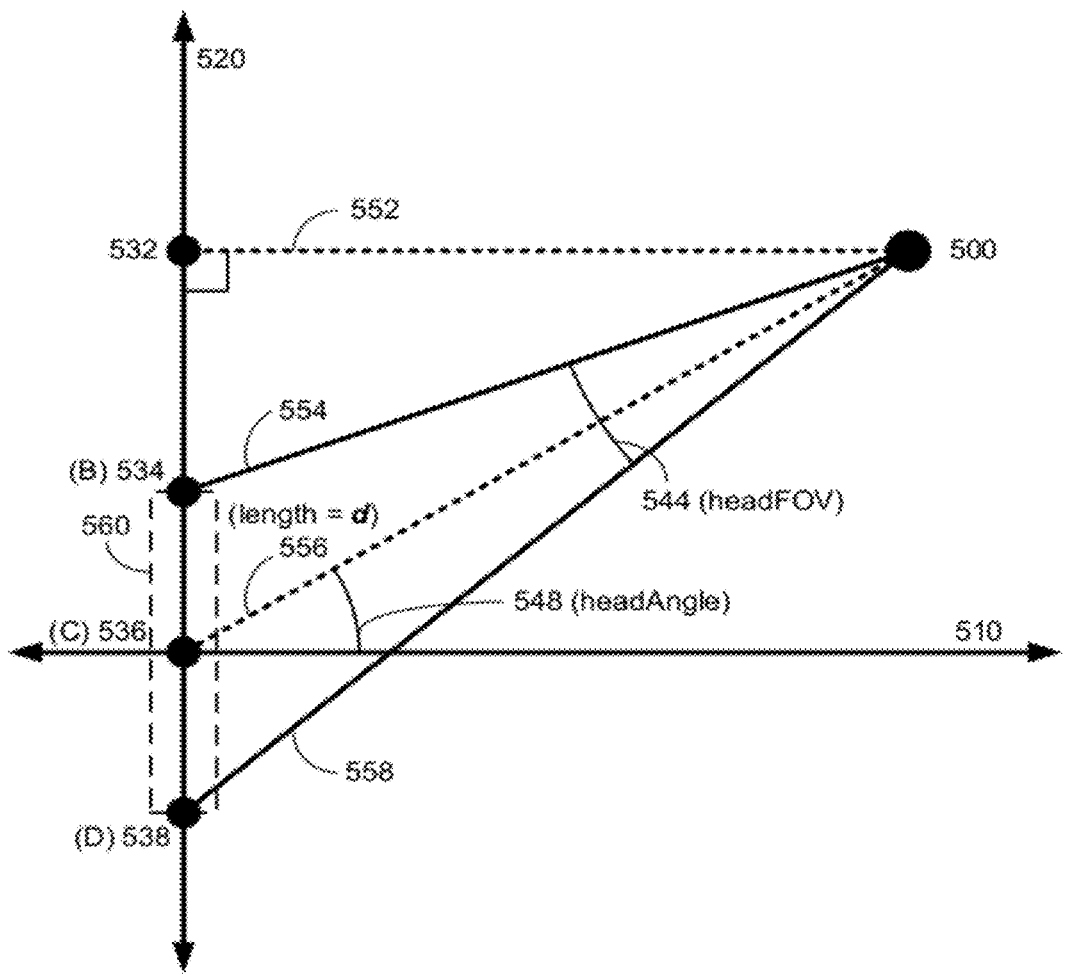
FIG. 5 is a non-limiting exemplary representation of the locations of the various elements that may be present in a dynamic perspective video window system and their relative geometry.

FIG. 5 is a non-limiting, exemplary graphical representation of the locations of the various elements that may be present in a dynamic perspective video window system and their relative geometry. In FIG. 5, representations of elements of the system and their geometric relationships are set forth on a rectangular coordinate system with x axis 510 and y axis 520 representing a single plane in the three-dimensional space in which a dynamic perspective video window system may be implemented. The plane represented may be the horizontal plane, the vertical plane, or any plane in three-dimensional space. A user or part of a user, such as a user's head, may be located at user point 500. The user may be operating a device embodying the presently disclosed system, in whole or in part, that may have display 560 with center point 536 that occupies the area between points 534 and 538 in the represented plane.

Line 552 may run perpendicular toy axis 520, intersecting y axis 520 at point 532. Line 554 may run from user point 500 to the right edge (from the perspective of user point 500) of display 560, intersecting y axis 520 at point 534 ('B' in the equations to follow). Alternatively, point 534 may be the top edge, bottom edge, or left edge of display 560. Line 558 may run from user point 500 to the left edge (from the perspective of user point 500) of display 560, intersecting y axis 520 at point 538 ('D' in the equations to follow). Alternatively, point 534 may be the top edge, bottom edge, or right edge of display 560. Line 556 may run from user point 500 to the center of display 560, intersecting y axis 520 at point 536 ('C' as used equations to follow). The distance from edge of display 560 at point 534 to the center of display 560 at point 536 may be distance BC, and the distance from edge of display 560 at point 538 to the center of display 560 at point 536 may be distance CD.

Angle 544 may be the angle created by lines 554 and 558, which may represent the field of view (headFOV) from the user (or user's head, for example) represented by user point 500. Angle 548 may be the angle between line 556 and x axis 510 (headAngle). Line 556 may have a length d that represents the distance from user point 500 to the center of display 560 at point 536. In one embodiment, headFOV may be useful in determining the section of an image or video frame to display to a user on a display that is part of a dynamic perspective video window system, as will be set forth in more detail below. In some embodiments, a headFOV value may be determined for both the vertical and horizontal planes.

In order to obtain the headFOV, in one embodiment, the following equation may be used:

$$eyeFOV = \arctan\left[\frac{d\sin(eyeAngle)+|CD|}{d\cos(eyeAngle)}\right] - \arctan\left[\frac{d\sin(eyeAngle)-|BC|}{d\cos(eyeAngle)}\right]$$

Note that in the equation shown above, as well as those to follow, multipliers may be used, or variables or other elements of the equations may be altered in order to obtain varying results. When the equations are used as shown, the change in perspective of a user or a part of user that is obtained matches a 1-to-1 change in the location or position of the user or part of a user. Alternatively, by manipulating the equations shown, and/or by using multipliers, the perspective obtained may not be a 1-to-1 correspondence to the change in the location or position of the user or part of a user. For example, a large change in the location or position of a user or a part of a user may result in only a small change in calculated perspective, or, in another embodiment, a small change in the location or position of a user or a part of a user may result in a large change in calculated perspective. All such embodiments are contemplated as within the scope of the present disclosure.

In some embodiments, further processing or calculations may be performed prior to or in addition to the calculations described herein. For example, methods and means of correcting for lens distortion and perspective distortion may be performed. Any type of lens or perspective distortion may be corrected for at any point when performing the methods described herein. Such correction may take the form of image warping, distortion compensation, or any other means of method. Such correction may be performed on scene images and/or user images. In one embodiment, lens and/or perspective distortion correction is performed on one or more scene images before further calculations as described herein are performed in order to render a more accurate dynamic perspective image. All methods and means of correcting for any type of distortion are contemplated as within the scope of the present disclosure.

Figure 6:
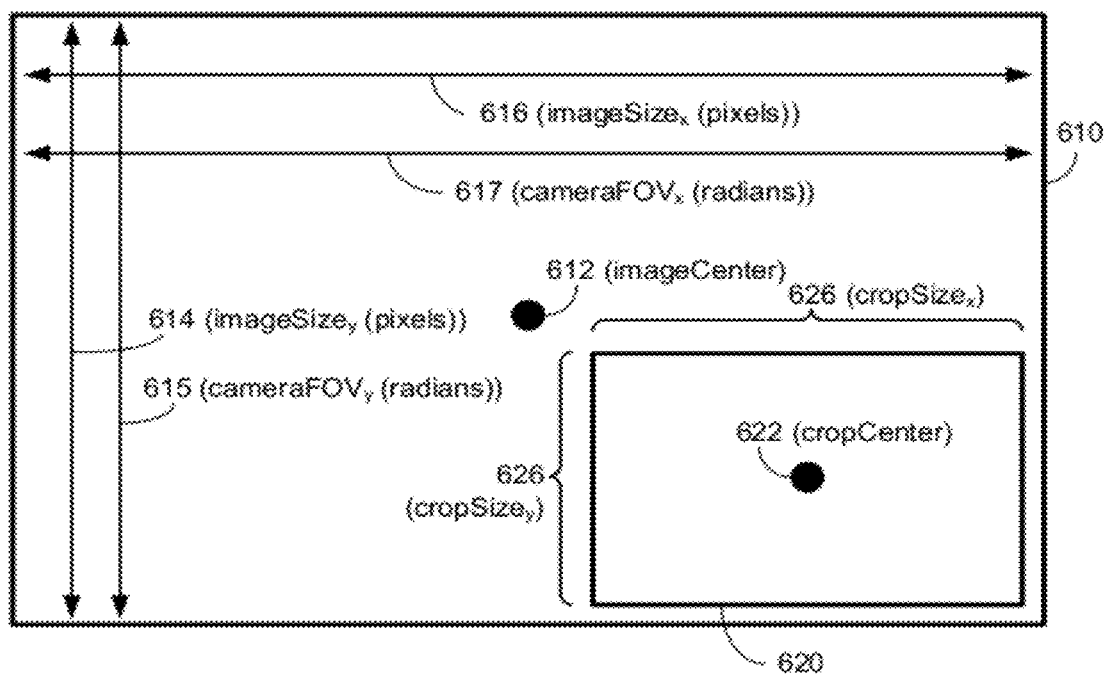
FIG. 6 is a non-limiting exemplary representation of the dimensions of images that may be detected and processed by a dynamic perspective video window system.

In some embodiments, the image or video frame presented to a user in a dynamic perspective video window system may be an image containing a subset of an image captured by a scene-facing detector or camera. FIG. 6 shows one exemplary, non-limiting representation of how an image captured by a scene-facing camera may be cropped to create an image presented to a user. Scene image 610 represents an image captured by a scene-facing camera or detector. User image 620 represents an image presented to a user that may be a subset of scene image 610. The center of scene image 610 is represented by scene image center point 612 (imageCenter). The center of user image 620 is represented by user image center point 622 (cropCenter).

Scene image 610 may be measured in radians (or any other unit) of the scene-facing detector's field of view (cameraFOV) and pixels of the scene image (imageSize). In one embodiment, these measurements can be used in conjunction with values determined using the equation shown above to determine the crop size and location of user image 620. First, a value of pixels per radian for each dimension may be determined using the scene-facing detector's field of view (cameraFOV) and pixels of the scene image (imageSize) using the following equation. Note that in the following equations, the subscript "xy" is used to indicate that the equations may be used to calculate values in either the x or y dimension:

$$pixelsPerRadian_{xy} = \frac{imageSize_{xy}}{cameraFOV_{xy}}$$

Next, the size of user image 620 in pixels may be determined for each dimension using the following equation:

$$cropSize_{xy} = headFOV_{xy} * pixelsPerRadian_{xy}$$

Finally, after determining the size of user image 620 in pixels, user image center point 622 (cropCenter) may be determined so that the appropriate subset of scene image 610 may be cropped from scene image 610 to create user image 620. The follow equation may be used to determine user image center point 622 (cropCenter):

$$cropCenter_{xy} = imageCenter_{xy} - (headAngle_{xy} * pixelsPerRadian_{xy})$$

Once user image center point 622 and the size of user image 620 in pixels is determined, scene image 610 can be cropped in the determined area creating user image 620. This may create an image that can be presented to a user that shows an image resembling what a user would see if the user were looking at the scene through a window located at the point where the display on which the user image 620 is presented is located. Note that in the equations shown above multipliers may be used, or variables or other elements of the equations may be altered, in order to obtain varying results. Other processing may be performed on user image 620 before it is presented to the user, including augmenting user image 620 with additional visual data such as video, graphics, text, or any other data or information that may be desired. This additional visual data may also be adjusted based on the results of any of the calculations performed as described herein and/or on the relative location of a user or a part of a user. Other means and methods of determining the size, location, and other alterations of user image 620 and/or additional visual data may be used, and all such means and methods are contemplated as within the scope of the present disclosure.

Figure 7:
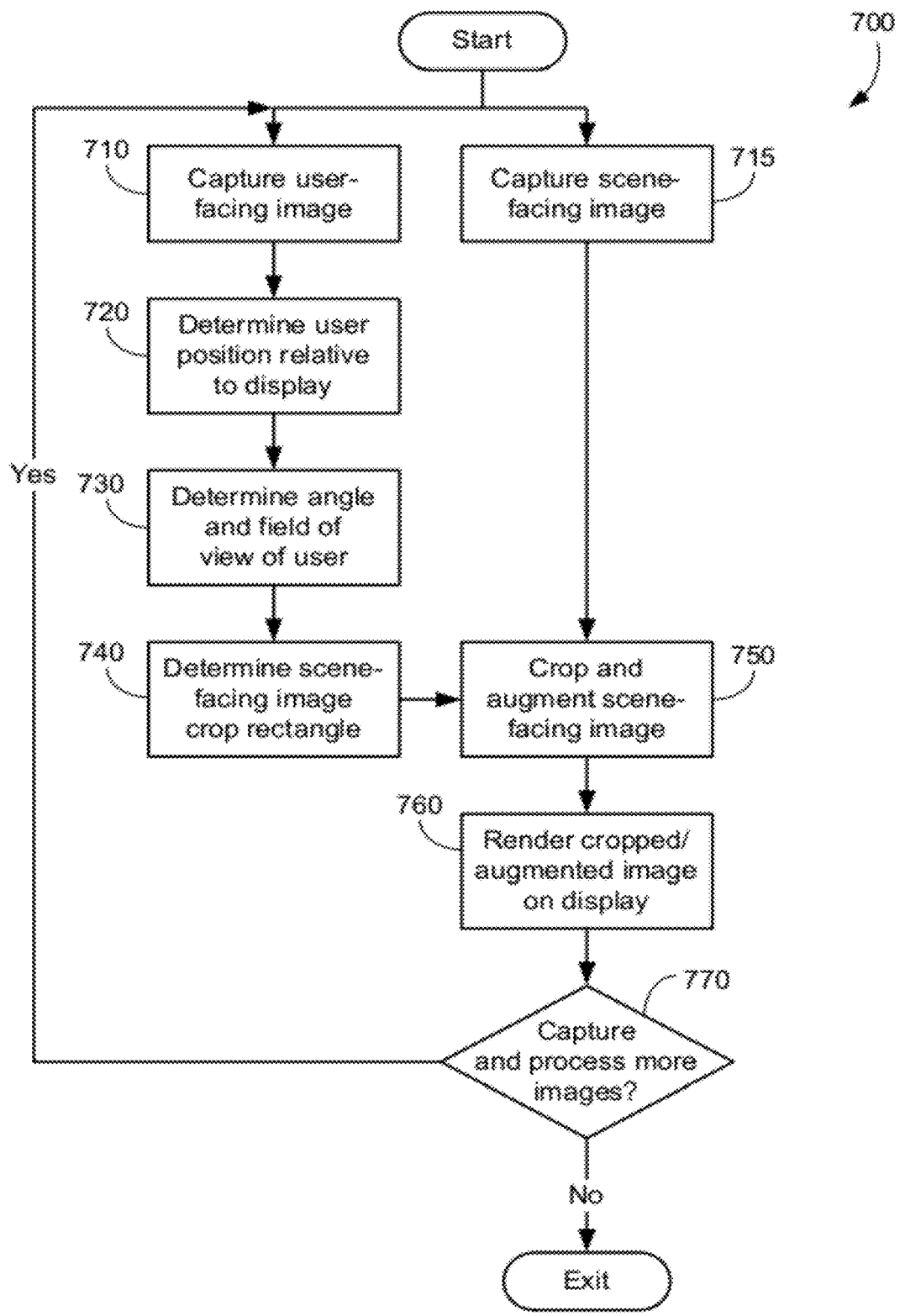
FIG. 7 is a non-limiting exemplary diagram of a method of implementing a dynamic perspective video window system.

FIG. 7 illustrates a non-limiting exemplary method 700 for implementing a dynamic perspective video window system. At block 710, a user-facing image is captured using a user-facing camera or detector of any type disclosed herein, or any other type of camera or detector capable of capturing data related to a user. At block 715, a scene-facing image is captured using a scene-facing camera or detector of any type disclosed herein, or any other type of camera or detector capable of capturing data related to a scene. The images captured at blocks 710 and 715 may be captured simultaneously so that the images are temporally synchronized and the processed image that is presented to the user represents an accurate real-time view. In other embodiments, the images captured at blocks 710 and 715 may not be captured simultaneously. In some embodiments, multiple images may be captured by multiple detectors, for example in a stereoscopic application, two images of a scene may be captured, and/or two images of a user's eyes may be captured. All such embodiments are contemplated as within the scope of the present disclosure.

At block 720, the user position relative to the display is determined This may be accomplished using any of the methods and means disclosed herein, or by using any other effective means of determine the position of a user. The determined position may be the three dimensional position of the user, including a distance or angle in the horizontal and/or vertical planes relative to the display, as well as a distance from the display. Alternatively, a subset of the possible position measurements of the user's position may be used. In some embodiments, a specific part or parts of a user will be detected and measured for position, such as a user's head, eyes, or torso. Alternatively, the entire user may be measured for position from the user-facing image.

In other embodiments, a representation of the user or a part or parts of the user may be measured for position. For example, a user may have affixed upon the user's head one or more detectable stickers, patches, or other indicator(s) composed of detectable material that are then detected by the user-facing detector. Alternatively, a user may be wearing glasses or other headgear that are detectable by a user-facing detector. In yet another embodiment, a user may be operating a device or other mechanism that serves as a proxy for the user, such as a robot or remote-controlled device. This remote-controlled device may be detected and measured for position at block 710. All such embodiments are contemplated as within the scope of the present disclosure.

At block 730, an angle and field of view of a user may be determined This may be done using the means described herein for determining these values, or alternate means may be used. Using the determined angle and field of view values, at block 740 the scene-facing image crop rectangle may be determined. Such a determination may include determining both the location and the dimensions of a crop rectangle in relation to the scene-facing image. This crop rectangle may be determined using the means described herein for determining the subset of the scene-facing image to use for a user image, or alternate means may be used. All such embodiments are contemplated as within the scope of the present disclosure.

At block 750, the scene-facing image captured at block 715 may be cropped using the crop rectangle determined at block 740. Also at block 750, the cropped image may be augmented with additional data, images, graphics, or other information as desired, for example when the resulting image is to be used in an augmented reality application. In another embodiment, additional data, images, etc. are added to or composited with the scene-facing image before the scene-facing image is cropped. Regardless of when additional data is composited with the scene-facing image, such additional data may also be adjusted or modified at block 750 based on the location of the user as determined and/or the calculations performed at blocks 720, 730, and 740. Alternatively, no additional data or information may be added to the cropped image. In yet another embodiment, no cropping may be performed, and additional data, images, graphics, or other information may be added to the scene-facing image.

At block 760, the augmented and/or cropped image is rendered on a display using any effective means or methods. The method is complete for that cycle where one user-facing image or video frame and one scene-facing image or video frame were captured. At block 770, a determination is made as to whether further images should be captured and processed. If so, in one embodiment, the method returns to blocks 710 and 715 to repeat the process, for example, to render ongoing video images. In other embodiments, the method is terminated after rendering the cropped/augmented image.

The methods and systems described herein may be implemented on one or more devices, components, or systems that are currently available or may be developed. Such devices, components, and systems may be designed or configured to implement parts of, or a complete, dynamic perspective video window system, and/or may be used for additional tasks or functions as well as implementing parts of or a complete dynamic perspective video window system. Non-limiting exemplary devices, components, and systems that may be used in implementing a dynamic perspective video window system, in whole or in part, are described in further detail below.

Exemplary Networked and Distributed Environments

One of ordinary skill in the art can appreciate that a computer or gaming console, or other client or server device, including handheld communications devices, mobile telephones, personal data assistants (PDAs), or any other device with computing and communications capabilities, can be deployed as part of a computer network, or in a distributed computing environment. In this regard, the present disclosure pertains to any dynamic perspective video window system, computer system, or virtual or augmented reality environment system as described herein, having any number of memory or storage units, and any number of applications and processes occurring across any number of storage units or volumes, which may be used in connection with a dynamic perspective video window system. The present disclosure may apply to an environment with server computers and client computers deployed in a network environment or distributed computing environment having remote or local storage. The present disclosure may also be applied to standalone computing devices, having programming language functionality, interpretation and execution capabilities for generating, receiving and transmitting information in connection with one or more dynamic perspective video window systems.

Distributed computing facilities may share computer resources and services by direct exchange between computing devices and systems, such as transmission of a captured user-facing or scene-facing image by a detector or camera to a computing device configured to communicate with several detectors or cameras. These resources and services include the exchange of information, cache storage, and disk storage for files. Distributed computing takes advantage of network connectivity, allowing clients to leverage their collective power to create and participate in sophisticated virtual environments. In this regard, a variety of devices may have applications, objects or resources that may implicate a dynamic perspective video window system that may utilize the techniques of the present subject matter.

Figure 8:
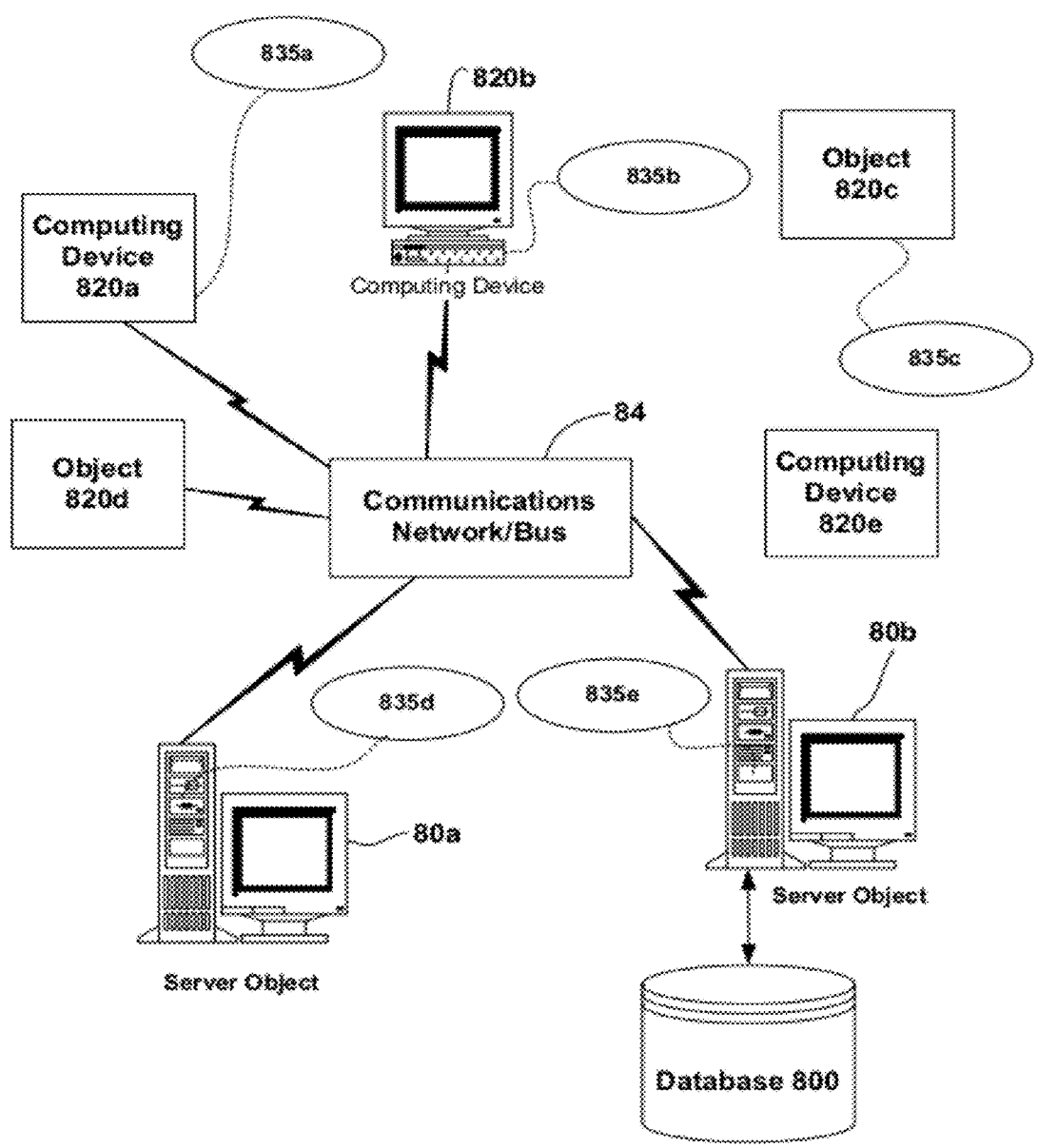
FIG. 8 is a block diagram representing an exemplary network environment having a variety of computing devices in which the present disclosure or parts thereof may be implemented.

FIG. 8 provides a schematic diagram of an exemplary networked or distributed system in which one or more dynamic perspective video window systems may be implemented, in some embodiments as part of a virtual or augmented reality environment system. The distributed system comprises server computing objects 80a, 80b, etc. and computing objects or devices 820a, 820b, 820c, etc. These objects may be personal computers, gaming consoles, portable devices, mobile communications devices, or any other computing device. These objects may comprise programs, methods, data stores, programmable logic, etc. The objects may comprise portions of the same or different devices such as personal digital assistants (PDAs), televisions, Moving Picture Experts Group (MPEG-1) Audio Layer-3 (MP3) players, televisions, personal computers, etc. Each object can communicate with another object by way of the communications network 84. This network may itself comprise other computing objects and computing devices that provide services to the system of FIG. 8. This network may include wired and/or wireless components. In accordance with an aspect of the present disclosure, each object 80a, 80b, etc. or 820a, 820b, 820c, etc. may contain an application that might function as a component or element of a dynamic perspective video window system.

In a distributed computing architecture, computers, which may have traditionally been used solely as clients, communicate directly among themselves and can act as both clients and servers, assuming whatever role is most efficient for the network or the virtual or augmented reality environment system. This reduces the load on servers and allows all of the clients to access resources available on other clients, thereby increasing the capability and efficiency of the entire network. A virtual or augmented reality environment system or a dynamic perspective video window system in accordance with the present disclosure may thus be distributed among servers and clients, acting in a way that is efficient for the entire system.

Distributed computing can help users of dynamic perspective video window systems interact and participate in a virtual or augmented reality environment across diverse geographic boundaries. Moreover, distributed computing can move data closer to the point where data is consumed acting as a network caching mechanism. Distributed computing also allows computing networks to dynamically work together using intelligent agents. Agents reside on peer computers and communicate various kinds of information back and forth. Agents may also initiate tasks on behalf of other peer systems. For instance, intelligent agents can be used to prioritize tasks on a network, change traffic flow, search for files locally, or determine anomalous behavior such as a virus and stop it before it affects the network. All sorts of other services may be contemplated as well. Since a virtual or augmented reality environment system may in practice be physically located in one or more locations, the ability to distribute information and data associated with a virtual or augmented reality environment system is of great utility in such a system.

It can also be appreciated that an object, such as 820c, may be hosted on another computing device 80a, 80b, etc. or 820a, 820b, etc. Thus, although the physical environment depicted may show the connected devices as computers, such illustration is merely exemplary and the physical environment may alternatively be depicted or described comprising various digital devices such as gaming consoles, PDAs, televisions, mobile telephones, cameras, detectors, etc., software objects such as interfaces, COM objects and the like.

There are a variety of systems, components, and network configurations that may support dynamic perspective video window systems. For example, computing systems and detectors or cameras may be connected together by wired or wireless systems, by local networks, or by widely distributed networks. Currently, many networks are coupled to the Internet, which provides the infrastructure for widely distributed computing and encompasses many different networks.

The Internet commonly refers to the collection of networks and gateways that utilize the Transport Control Protocol/Interface Program (TCP/IP) suite of protocols, which are well-known in the art of computer networking. The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 8, computers 820a, 820b, etc. can be thought of as clients and computers 80a, 80b, etc. can be thought of as the server where server 80a, 80b, etc. maintains the data that is then replicated in the client computers 820a, 820b, etc.

A server is typically a remote computer system accessible over a local network such as a LAN or a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a URL address. For example, communication can be provided over a communications medium. In particular, the client and server may be coupled to one another via TCP/IP connections for high-capacity communication.

Thus, FIG. 8 illustrates an exemplary networked or distributed environment, with a server in communication with client computers via a network/bus, in which the present disclosure may be employed. In more detail, a number of servers 80a, 80b, etc., are interconnected via a communications network/bus 84, which may be a LAN, WAN, intranet, the Internet, etc., with a number of client or remote computing devices 820a, 820b, 820c, 820d, 820e, etc., such as a portable computer, handheld computer, thin client, networked appliance, mobile telephone, personal computer, gaming console, or other device, in accordance with the present disclosure. It is thus contemplated that the present disclosure may apply to any computing device that may communicate, interact, and/or operate in or with a dynamic perspective video window system.

In a network environment in which the communications network/bus 84 is the Internet, for example, the servers 80a, 50b, etc. can be web servers with which the clients 820a, 820b, 820c, 820d, 820e, etc. communicate via any of a number of known protocols such as HTTP. Servers 80a, 80b, etc. may also serve as clients 820a, 820b, 820c, 820d, 820e, etc., as may be characteristic of a distributed virtual environment or a distributed dynamic perspective video window system. Communications may be wired or wireless, where appropriate. Client devices 820a, 820b, 820c, 820d, 820e, etc. may or may not communicate via communications network/bus 84, and may have independent communications associated therewith. Each client computer 820a, 820b, 820c, 820d, 820e, etc. and server computer 80a, 80b, etc. may be equipped with various application program modules or objects 835a, 835b, 835c, 835d, 835e, etc. and with connections or access to various types of storage elements or objects, across which files, images, or frames may be stored or to which portion(s) of files, images, or frames may be downloaded or migrated. Any computers 80a, 80b, 820a, 820b, 820c, 820d, 820e, etc. may be responsible for the maintenance and updating of database 800 or other storage element in accordance with the present subject matter, such as a database or memory 800 for storing dynamic perspective video window system data, such as captured, augmented, and/or modified files, images, and/or frames. Database 800 and one or more of computers 80a, 80b, 820a, 820b, 820c, 820d, 820e, etc, may form elements of a dynamic perspective video window system as described herein that may interact or be a component of a dynamic perspective video window system according to the present disclosure. Thus, the present disclosure can be utilized in a computer network environment having client computers 820a, 820b, 820c, 820d, 820e, etc. that can access and interact with a computer network/bus 84 and server computers 80a, 80*b*, etc. that may interact with client computers 820*a*, 820*b*, 820*c*, 820*d*, 820*e*, etc. and other like devices, and databases 800.

Exemplary Computing Environment

Figure 9:
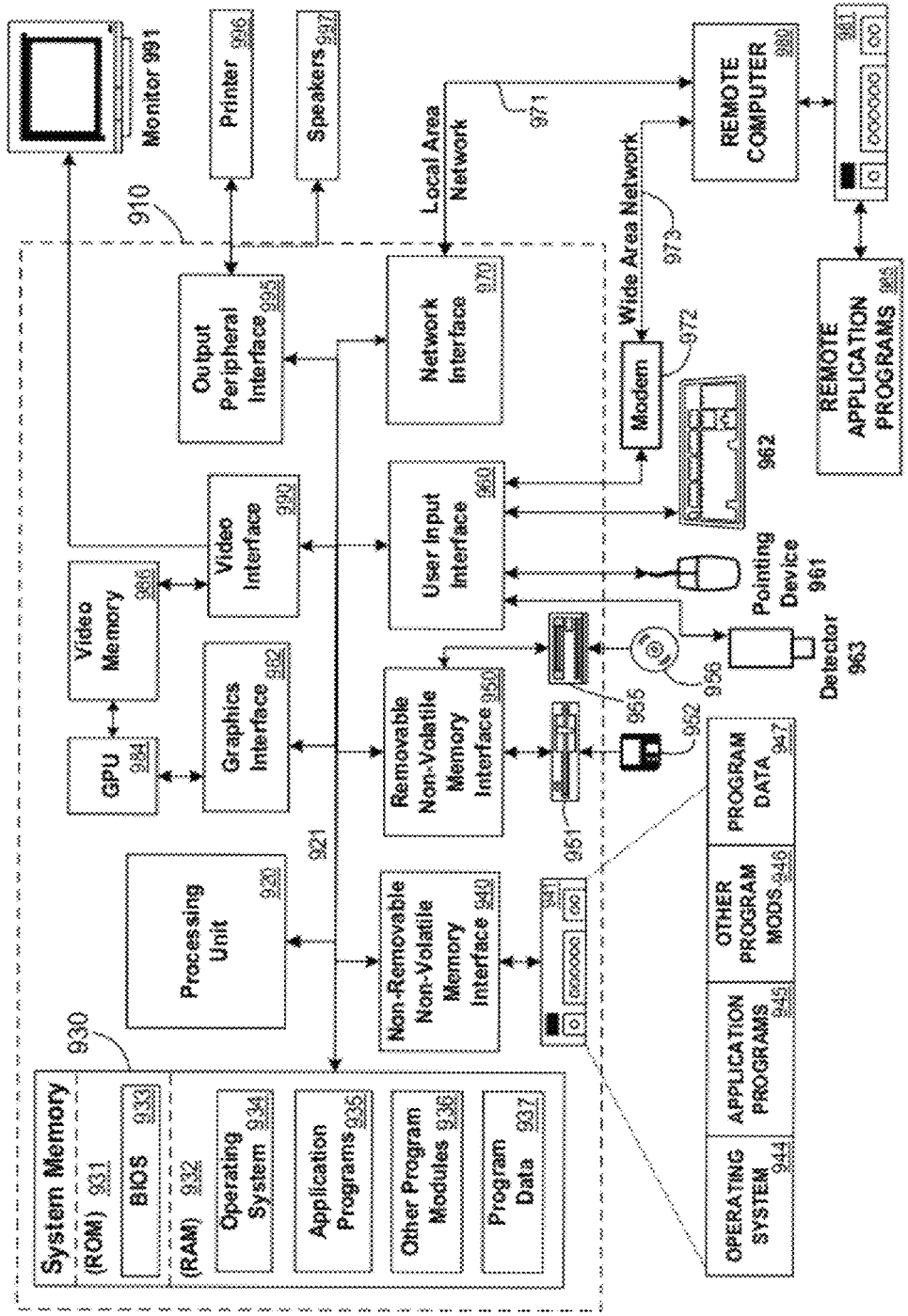
FIG. 9 is a block diagram representing an exemplary non-limiting computing device in which the present disclosure or parts thereof may be implemented.

FIG. 9 and the following discussion are intended to provide a brief general description of a suitable computing environment in which the present disclosure or parts thereof may be implemented. It should be understood, however, that handheld, portable and other computing devices and computing objects of all kinds are contemplated for use in connection with the present disclosure, as described above. Thus, while a general purpose computer is described below, this is but one example, and the present disclosure may be implemented with other computing devices, such as a thin client having network/bus interoperability and interaction. The present disclosure may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that a dynamic perspective video window system may be employed is a desirable, or suitable, environment for the dynamic perspective video window systems of the disclosure.

Although not required, the present disclosure can be implemented via an operating system, for use by a developer of services for a device or object, and/or included within application software that operates in connection with a dynamic perspective video window system. Software may be described in the general context of computer-executable instructions, such as program modules, being executed by one or more computers, such as client workstations, servers, gaming consoles, mobile devices, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the present disclosure may be practiced with other computer system configurations. Other well known computing systems, environments, and/or configurations that may be suitable for use with the present subject matter include, but are not limited to, personal computers (PCs), gaming consoles, automated teller machines, server computers, hand-held or laptop devices, multi-processor systems, microprocessor-based systems, programmable consumer electronics, network PCs, appliances, environmental control elements, minicomputers, mainframe computers, digital cameras, wireless telephones, and the like. The disclosure may also be practiced in distributed computing environments where tasks are performed by remote processing devices that are linked through a communications network/bus or other data transmission medium, as described herein in regard to FIG. 8. In a distributed computing environment, program modules may be located in both local and remote computer storage media including memory storage devices, and client nodes may in turn behave as server nodes.

FIG. 9 thus illustrates an example of a suitable computing system environment 900 in which the present subject matter or parts thereof may be implemented, although as made clear above, computing system environment 900 is only one example of a suitable computing environment and is not intended to suggest any limitation as to the scope of use or functionality of the disclosure. Devices functioning as components or parts of a dynamic perspective video window system may be implemented using a system such as computing system environment 900, but those skilled in the art will recognize that there are other appropriate systems in which to implement the present disclosure. Computing system environment 900 should not be interpreted as having any dependency or requirement relating to any one or combination of components illustrated in the exemplary operating environment 900.

With reference to FIG. 9, an exemplary system for implementing the disclosure includes a general purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus.)

Computer 910 typically includes a variety of computer-readable media. Computer-readable media can be any available media that can be accessed by computer 910 and includes both volatile and nonvolatile media and removable and non-removable media. By way of example, and not limitation, computer-readable media may comprise computer storage media and communication media. Computer storage media includes both volatile and nonvolatile and removable and non-removable media implemented in any method or technology for storage of information such as computer-readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), digital versatile disks (DVD) or other optical disk storage, magnetic cassettes, magnetic tape, magnetic disk storage or other magnetic storage devices, or any other medium that can be used to store the desired information and that can accessed by computer 910. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

System memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

Computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Hard disk drive 941 is typically connected to the system bus 921 through an non-removable memory interface such as interface 940, and magnetic disk drive 951 and optical disk drive 955 are typically connected to system bus 921 by a removable memory interface, such as interface 950.

The drives and their associated computer storage media discussed above and illustrated in FIG. 9 provide storage of computer-readable instructions, data structures, program modules and other data for computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into computer 910 through input devices such as a keyboard 962 and pointing device 961, commonly referred to as a mouse, trackball or touch pad. Alternatively, pointing device 961 may be a controller used with a gaming console. Detector 963 may communicate with computer 910 through interface 960 to provide images, video frames, and/or other detected information or data to computer 910. Detector 963 may be a camera of any type, or any other type of detection device. Other input devices (not shown) may include a microphone, joystick, game pad, satellite dish, scanner, or the like.

These and other input devices are often connected to processing unit 920 through a user input interface 960 that is coupled to system bus 921, but may be connected by other interface and bus structures, such as a parallel port, game port or a universal serial bus (USB). A graphics interface 982 may also be connected to system bus 921. One or more graphics processing units (GPUs) 984 may communicate with graphics interface 982. In this regard, GPUs 984 generally include on-chip memory storage, such as register storage and GPUs 984 communicate with a video memory 986. GPUs 984, however, are but one example of a coprocessor and thus a variety of coprocessing devices may be included in computer 910. A monitor 991 or other type of display device may also connect to system bus 921 via an interface, such as a video interface 990, which may in turn communicate with video memory 986. In addition to monitor 991, computers may also include other peripheral output devices such as speakers 997 and printer 996, which may be connected through an output peripheral interface 995.

Computer 910 may operate in a networked or distributed environment using logical connections to one or more remote computers, such as a remote computer 980. Remote computer 980 may be a personal computer, a server, a router, a network PC, a peer device or other common network node, and typically includes many or all of the elements described above relative to computer 910, although only a memory storage device 981 has been illustrated in FIG. 9. The logical connections depicted in FIG. 9 include a local area network (LAN) 971 and a wide area network (WAN) 973, but may also include other networks/buses, including wireless networks. Such networking environments are commonplace in homes, offices, enterprise-wide computer networks, intranets and the Internet.

When used in a LAN networking environment, computer 910 is connected to LAN 971 through a network interface or adapter 970. When used in a WAN networking environment, computer 910 typically includes a modem 972 or other means for establishing communications over WAN 973, such as the Internet. Modem 972, which may be internal or external, may be connected to system bus 921 via user input interface 960, or other appropriate mechanism. In a networked environment, program modules depicted relative to computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers, including all wired and wireless means, may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of providing a dynamic perspective video window, comprising:
    capturing a first image with a first detector;
    capturing a second image with a second detector;
    determining a position of a user based on the second image;
    determining a crop area based on a position of the user;
    cropping the first image based on the crop area;
    determining an augmentation image;
    augmenting the first cropped image by compositing the augmentation image with the first cropped image to generate a composite image; and
    rendering the composite image on a display.

2. The method of claim 1, further comprising augmenting the first cropped image by compositing graphical elements with the first cropped image to generate the composite image.

3. The method of claim 1, further comprising augmenting the first cropped image with a supplemental image to generate the composite image.

4. The method of claim 1, wherein determining the position of the user based on the second image comprises determining at least one of a horizontal orientation of the user, a vertical orientation of the user, and a distance of the user from the display.

5. The method of claim 1, wherein determining the crop area based on the position of the user comprises determining a field of view of the user.

6. The method of claim 1, wherein determining the position of the user based on the second image comprises determining a position of a portion of the user.

7. The method of claim 6, wherein the portion of the user is at least one of a head of the user, an eye of the user, a torso of the user, and a body of the user.

8. A computer-readable medium that is not a transient signal, the computer-readable storage medium comprising computer-readable instructions for providing a dynamic perspective video window, the computer-readable instructions comprising instructions for:

capturing a first image with a first camera;
   capturing a second image with a second camera;
   determining a position of a user based on the second image;
   determining a crop area based on the position of the user;
   cropping the first image based on the crop area;
   determining an augmentation image;
   augmenting the first cropped image by compositing the augmentation image with the first cropped image to generate a composited image; and
   transmitting the composited image to a display.

9. The computer-readable medium of claim 8 wherein instructions for determining the position of the user based on the second image comprise instructions for determining a position of a portion of the user.

10. The computer-readable medium of claim 9, wherein instructions for determining the crop area based on the position of the user comprise instructions for determining a field of view of the user.

11. The computer-readable medium of claim 8, further comprising instructions for transmitting a request for data to a remote device, receiving the data from the remote device, and, based on the received data, further augmenting the first cropped image.

12. The computer-readable medium of claim 11, further comprising instructions for formatting the received data in a text format, and wherein further augmenting the first cropped image comprises overlaying the received data in the text format on the first cropped image to generate the composited image.

13. A system for providing a dynamic perspective video window, comprising:

a first detector configured to capture a first image;
   a second detector configured to capture a second image;
   a processor configured to:
      determine a position of a user based on the second image;
      determine a crop area based on the position of the user;
      crop the first image based on the crop area;
      determine an augmentation image; and
      generate a first display image by augmenting the first cropped image by compositing the augmentation image with the first cropped image; and
   a first display configured to render the first display image.

14. The system of claim 13, further comprising a second display, wherein the processor is further configured to determine a second position of the user based on the second image and generate a second display image based on the first image and the second position of the user, and wherein the second display is configured to render the second display image.

15. The system of claim 14, wherein the processor configured to determine the first position of the user based on the second image comprises the processor configured to determine a first position of a first eye of the user, and
   wherein the processor configured to determine the second position of the user based on the first user image comprises the processor configured to determine a second position of a second eye of the user.

16. The system of claim 13, wherein the processor is further configured to generate a first supplemental image and generate the first display image by augmenting the first cropped image with the first supplemental image.

17. The system of claim 13, further comprising a communications component configured to transmit data to a remote device and receive data from the remote device.

18. The system of claim 13, wherein the first detector is configured in a first housing and the processor is configured in a second housing.

19. The system of claim 18, wherein the first detector is further configured to wirelessly transmit the first to the processor.

20. The system of claim 13, wherein the second detector is configured in a first housing and the processor is configured in a second housing.

* * * * *